United States Patent [19]

Horna

[11] 4,113,997
[45] Sep. 12, 1978

[54] ANALOG TO DIGITAL SIGNAL OF LOGARITHMIC FORMAT CONVERTER AND ANALOG TO PSEUDO-RMS VALUE CONVERTER AND ECHO CANCELLER UTILIZING SAME

[75] Inventor: Otakar Anthony Horna, Bethesda, Md.

[73] Assignee: Communications Satellite, Corporation, Washington, D.C.

[21] Appl. No.: 814,942

[22] Filed: Jul. 12, 1977

[51] Int. Cl.² .................... H04B 3/20; G01R 1/02; H03K 13/00
[52] U.S. Cl. .................... 179/170.2; 324/132; 328/26; 340/347 DD
[58] Field of Search .................... 179/170.2

[56] References Cited

U.S. PATENT DOCUMENTS

| | | | |
|---|---|---|---|
| 2,397,961 | 4/1946 | Harris, Jr. | 328/144 |
| 3,194,951 | 7/1965 | Schaefer | 340/347 DD |
| 3,875,344 | 4/1975 | Bogart | 340/347 DD |
| 4,041,334 | 8/1977 | Umeda | 328/26 |

OTHER PUBLICATIONS

*IBM Technical Disclosure Bulletin,* vol. 5, No. 5, Oct. 1962, pp. 30–31, "Logarithmic Digital to Analog Converter", T. J. Harrison.

*Primary Examiner*—George G. Stellar
*Attorney, Agent, or Firm*—Sughrue, Rothwell, Mion, Zinn and Macpeak

[57] ABSTRACT

Improvements in a digital echo canceller utilizing pseudo-logarithmic coding are disclosed which reduce the complexity and cost while improving the performance of the echo canceller. Specifically, there is disclosed an improved analog to pseudo-logarithmic converter, a first and a second embodiment of an improved pseudo-rms to dc converter, an improved $\phi(x)$ function generator, and an improved error detector.

13 Claims, 7 Drawing Figures

ANALOG TO DIGITAL SIGNAL OF LOGARITHMIC FORMAT CONVERTER AND ANALOG TO PSEUDO-RMS VALUE CONVERTER AND ECHO CANCELLER UTILIZING SAME

CROSS-REFERENCE TO RELATED APPLICATION

This application discloses an improvement to the subject matter of my co-pending application, U.S. Ser. No. 694,878, filed June 11, 1967, now U.S. Pat. No. 4,064,379 and assigned to the assignee of the present application.

BACKGROUND OF THE INVENTION

The present invention is in the field of echo cancellers. More specifically, the present invention provides improvements in the performance of an echo canceller with an adaptive transfer filter utilizing pseudo-logarithmic coding, while at the same time reducing the complexity and cost of the canceller.

In long-distance telephone communication networks, four-wire links are utilized over a substantial portion of the transmission path: one of the pairs being dedicated to only transmitting the signal to the destination, and the other pair being dedicated only to receiving the signal sent from the destination. A hybrid coil is used to combine the separate signals on the transmit and receive pairs for a single two-wire circuit.

It is well known that the hybrid coil does not provide echo-free coupling between the send and receive pairs of the four-wire link; a portion of the signal on the receive pair passes to the send pair and appears as an echo signal.

In my prior echo canceller, as disclosed in U.S. Pat. No. 4,064,379, and as shown in FIG. 1 herein, the received signal $X(t)$ is sampled and converted into its absolute value in stage 10, and then further converted into a 7-bit pseudo-logarithmic companding code in a special analog-to-digital converter 12. The entire digitized sample $x_i$ is multiplexed in multiplexer 14, and then stored in a plurality of shift registers forming X-register 16. An average for pseudo-rms value of the $x_i$ samples is computed in stage 18, and the samples are also compared in a comparator 20 with the stored average or pseudo-rms value. An H-register 22 stores N digital words, $h_1$ through $h_n$ representing the echo path impulse response. When the sample $x_i$ is greater than the average or pseudo-rms value, a control signal $\phi(x)$ from comparator 20 causes updating of the existing value of the corresponding digital word $h_i$ stored in H-register 22. The average or pseudo-rms value of incoming signal $X(t)$ is also converted in a digital-to-analog converter 24 to a reference voltage $X_j$ used to bias an analog center clipper 26 and to also bias an analog comparator 28. A band pass filter 30, pre-emphasis circuit 32, and a low pass filter with a de-emphasis circuit 34 reduce the harmonic distortion caused by center clipper 26. The sample $x_i$ and corresponding digital word $h_i$ stored in the X-register 16 and H-register 22, respectively, are fed into a multiplier 36 in order that the pseudo-logarithmic encoded $x_i$ and $h_i$ values may be used directly without further conversion. The multiplication is performed in three different ways: when the exponents are both non-zero, addition of the exponents and mantissas in two adders takes place; when the exponents are both zero, the mantissas are directly multiplied; and when only one exponent is non-zero, both mantissas are directly multiplied and added to the mantissa of the number with a zero exponent, and the product is shifted in a shift register according to the value of the exponent. The result of the multiplication is then added to, or subtracted from, the contents of an accumulator 38. The output $r_j$ of the accumulator 38 is converted in a digital-to-analog converter 40 into an analog voltage which is subtracted in a differential amplifier 42 from the echo signal $y(t)$ which is present in the transmit pair of the four-wire circuit.

While my prior echo canceller is superior in performance and lower in cost than conventional digital echo cancellers, if its complexity could be reduced without sacrificing performance, a considerable cost saving could be achieved.

SUMMARY OF THE INVENTION

It is therefore an object of the present invention to simplify the hardware required in an echo canceller with logarithmic encoding without sacrificing performance.

It is more specifically an object of the present invention to redesign the echo canceller with logarithmic encoding so that its complexity, size and cost are reduced without sacrificing performance.

These and other objects of the invention are achieved by:

(a) substantially reducing the complexity and cost while increasing the performance of the analog-to-pseudo-logarithmic converter designated generally by reference numeral 50 of FIG. 1;

(b) substantially reducing the complexity and cost while increasing the performance of the dc pseudo-rms converter designated generally by the reference numeral 60 of FIG. 1;

(c) substantially reducing the complexity and cost while increasing the performance of the generator of the $\phi(x)$ function generated by digital comparator 20 of FIG. 1; and (d) substantially reducing the complexity and cost while increasing the performance of the error detector designated generally by the reference numeral 70 of FIG. 1.

In the improved analog-to-pseudo-logarithmic converter, as shown in FIG. 2, input signal $X(t)$ is sampled and then sent to an absolute value stage. Sample $|x_i|$ is then applied to an analog-to-digital converter for quantizing an encoding, and the sign of sample $x_i$ is sent to the X-register 16. The serial 11 bit output from the analog-to-digital converter is serially converted to a 7-bit pseudo-logarithmic digital code using a conventional shift register, counter and two AND gates. The serial conversion results in a significant reduction in the complexity and cost while improving the performance of the analog-to-pseudo-logarithmic converter 50.

In the first embodiment of the improved pseudo-rms to dc converter 60, shown in FIG. 2, sample $|x_i|$ is passed through a low pass filter, peak detector and operational amplifier in series connection to produce a dc signal $X_j$. This results in a significant reduction in the complexity and cost while improving the performance of the pseudo-rms to dc converter.

In the second embodiment of the improved pseudo-rms to dc converter, as shown in FIG. 3, signal $X(t)$ is fed to a first "ideal" full-wave rectifier and is also shifted 90° and fed to a second "ideal" full-wave rectifier. The outputs of both full-wave rectifiers are summed and then fed through a low-pass filter. The output of the low-pass filter is fed to a peak detector having a substantially improved "attack" time constant, which results in an improved performance, when the amplitude of signal X(t) suddenly increases. The second embodiment of the improved pseudo-rms to dc converter results in improved performance as well as in a reduction in circuit complexity and cost. The improved $\phi(x)$ function generator 20, as shown in FIG. 2, outputs a logic one if and only if the respective sample $|x_i|$ fulfills the following conditions:

(a) The amplitude of sample $|x_i|$ is greater than the average value analog voltage $X_j$;
(b) The amplitude of sample $|x_i|$ is less than the overload amplitude $V_{REF2}$;
(c) The amplitude of sample $|x_i|$ is greater than the background noise amplitude $V_{REF1}$.

The improved error detector 70, as shown in FIG. 5, samples the true echo signal Y(t) and then compares the sample y(t) with the estimated echo signal $r_j$ to produce error signal $\epsilon_j$. Error signal $\epsilon_j$ is then compared in symmetrically biased operational amplifiers used as comparators which, in turn, produce the $\Delta h$ value and the Sg($\Delta h$) value. All of these improved circuits of the present invention reduce the complexity and cost, while increasing the performance of my prior echo canceller.

DESCRIPTION OF THE PREFERRED EMBODIMENTS

Figure 1:
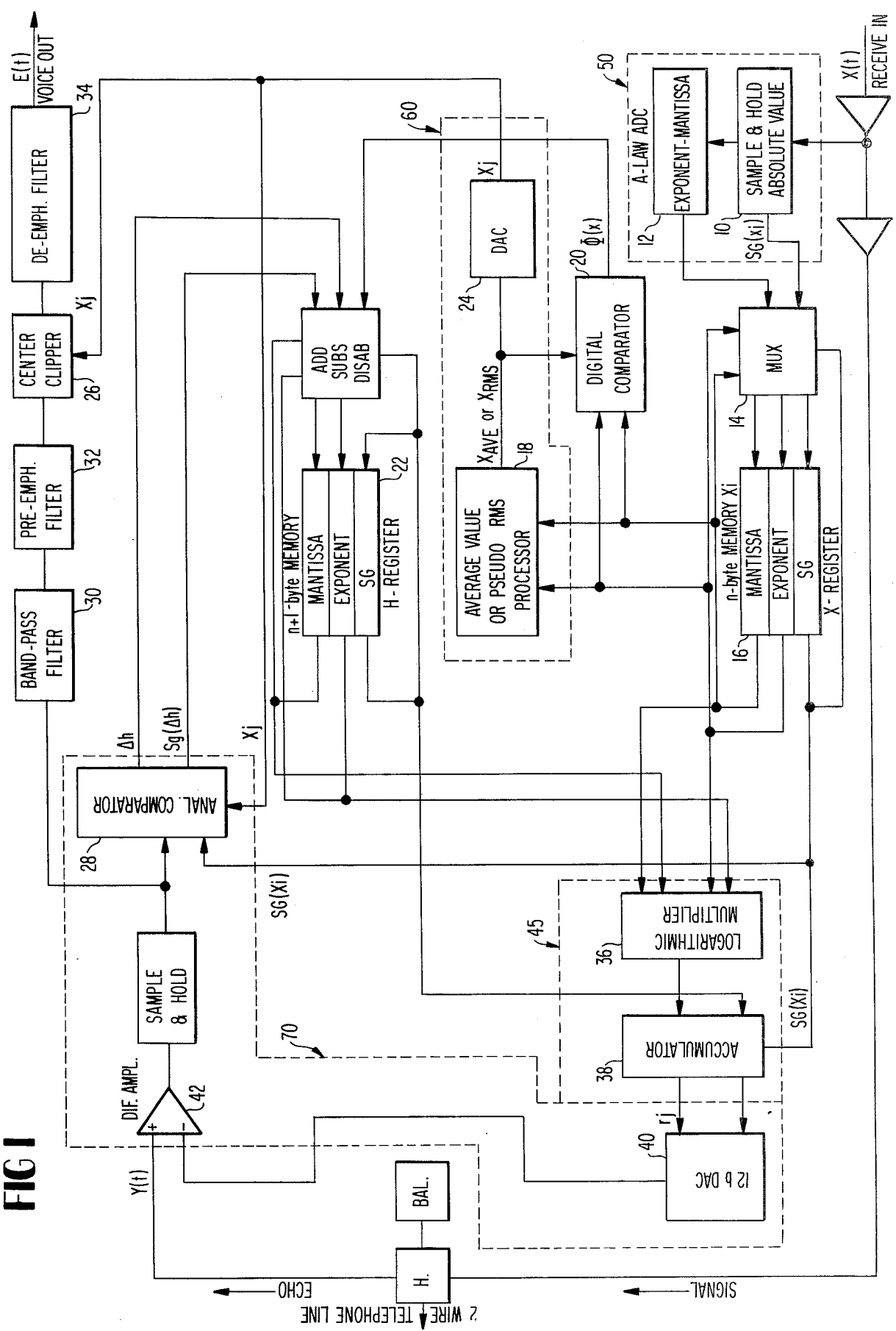
FIG. 1 is a block diagram of the prior echo canceller with logarithmic encoding which is improved by the present invention.
Figure 2:
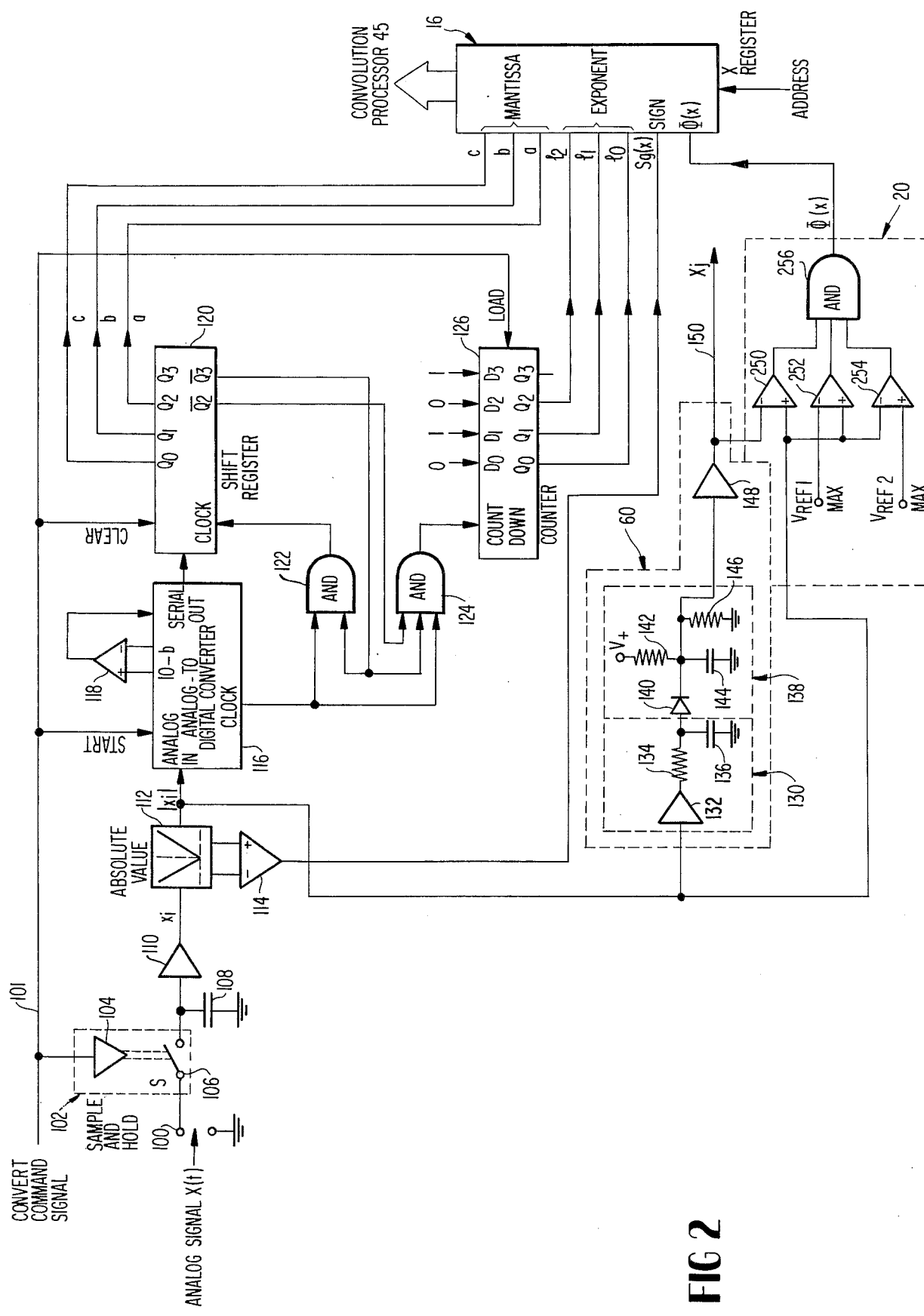
FIG. 2 is a block diagram of the improved analog-to-digital pseudo-logarithmic converter, the first embodiment of the improved pseudo-rms to dc converter, and the improved $\phi(x)$ function generator of the present invention.

In the present invention, the analog-to-digital pseudo-logarithmic converter 50 of my prior echo canceller, as shown in FIG. 1, is replaced by an improved analog-to-digital pseudo-logarithmic converter, as shown in FIG. 2. An analog signal X(t) is applied to an input 100. Input 100 is connected to a sample and hold circuit, designated generally by reference numeral 102, which is of conventional design and is commercially available from the Harris Corporation, Syosset, N.Y., under the designation No. HA-2425. Sample and hold circuit 102 has a driver 104 which controls an electronic switch 106 for obtaining a sample $x_i$ of analog signal X(t). Driver 104 is controlled by a convert command signal on a line 101 which is the same convert command signal provided to sample and hold stage 10 of my prior echo canceller.

Sample $x_1$ at the output of electronic switch 106 is held at a capacitor 108 and is amplified by an operational amplifier 110. The other lead of capacitor 108 is connected to ground.

Signal $x_i$ at the output of operational amplifier 110 is sent to an absolute value stage 112, which is of conventional design and is described at pages 23, 24 of *Analog-Digital Conversion Handbook*, 2d Ed., 1976, published by Analog Devices, Inc., Norwood Mass. A positive and a negative input of a comparator 114 are connected to absolute value stage 112 to determine the sign of sample $x_i$. Comparator 114 is of conventional design. The output logic signal Sg(x) of comparator 114, which indicates the sign of the respective samples $x_i$, is fed to the X-register 16.

The absolute value of sample $x_i$ present at the output of absolute value stage 112 is provided to an input of an analog-to-digital converter 116, which is of conventional design and is commercially available from Analog Devices, Inc., Norwood, Mass. Analog-to-digital converter 116 performs a quantization with linear steps on sample $|x_i|$ and then outputs the encoded quantization value in a serial 10 bit stream. A comparator 118 is connected to analog-to-digital converter 116 to control the internal logic therein. The start input of analog-to-digital converter 116 is connected to receive the convert command signal from line 101.

The serial 10 bit stream from the output of analog-to-digital converter 116 is applied to an input of a shift register 120. Shift register 120 is of conventional design and is commercially available from Texas Instruments, Inc., Dallas, Tex., under Part No. SN74164. The clear input of shift register 120 is connected to receive the convert command signal from line 101. Non-inverting outputs $Q_0$, $Q_1$, and $Q_2$ are individually connected to X-register 16.

The clock signal to analog-to-digital converter 116 is applied to a first input of an AND gate 122 and to a first input of an AND gate 124. AND gates 122, 124 are of conventional design. The inverting $\overline{Q_2}$ output of shift register 120 is connected to a second input of AND gate 124. The inverting output $\overline{Q_3}$ is applied to a second input of AND gate 122 and to a third input of AND gate 124. The output of AND gate 122 is connected to the clock input of shift register 120.

The output of AND gate 124 is applied to the countdown input of a counter 126, which is of conventional design and is commercially available from Texas Instruments, Inc., under the designation SN74193. The binary code 0101 may be selectively loaded at the inputs $D_0$, $D_1$, $D_2$, and $D_3$, respectively, of counter 126. The outputs $Q_0$, $Q_1$, and $Q_2$ of counter 126 are individually applied to X-register 16. The load input of counter 126 is connected to receive the convert command signal from line 101.

Having described the construction, the operation of the improved analog-to-digital pseudo-logarithmic converter of the present invention is now described. A convert command signal is provided on line 101. This convert command signal causes sample and hold circuit 102 to sample signal X(t) which causes sample $x_i$ to be applied to the absolute value stage 112. The convert command signal also causes the analog-to-digital converter 116 to quantize and encode the sample $|x_i|$ provided at the output of absolute value stage 112. The convert command signal also causes the stages of shift register 120 to be cleared as well as causing the 0101 code to be loaded into inputs $D_0$ to $D_3$ of counter 126. As is well known, the first bit in the bit stream from analog-to-digital converter 116 is the most significant bit, and the last bit is the least significant bit. As each bit is outputed from analog-to-digital converter 116, a clock pulse is sent to AND gates 122 and 124. Since shift register 120 is cleared by the convert command signal on line 101 at the beginning of the sample cycle, a logic 1 is present at inverting outputs $\overline{Q_2}$ and $\overline{Q_3}$; these result in AND gates 122 and 124 being enabled each time a bit is outputed from analog-to-digital converter 116. The first bit outputed, which is the most significant bit, is provided to stage $Q_O$ of shift register 120. Each successive bit that is outputed in loaded into the first stage of shift register 120, and each bit therein is transferred over one stage, as long as there is a logic 1 at inverting output $\overline{Q}_2$. Moreover, each time a bit is transferred, the clock pulse from analog-to-digital converter 116 causes counter 126 to count down one bit from the initial 0101 initial value loaded at the beginning of the sample cycle. When the first logic 1 reaches stage $Q_2$ of shift register 120, the output of inverting output $\overline{Q}_2$ changes to a 0 bit, which disables AND gate 124 and stops the countdown of counter 126. The binary output from counter 126, which corresponds to the exponent of the pseudo-logarithmic digital code, is then loaded into X-register 16. In the next clock cycle, the first 1 bit is transferred to stage $Q_3$ of shift register 120 causing AND gate 122 to be disabled which blocks the loading of any additional bits into shift register 120. The bits of the serial bit stream on non-inverting outputs of shift register 120, which correspond to the mantissa, are also loaded into X-register 16.

Thus, the serial conversion algorithm used by the improved analog-to-digital pseudo-logarithmic converter of the present invention provides the sign Sg(x), exponent e, and mantissa a, b, c, values of the 7-bit pseudo-logarithmic code being used immediately at the end of the conversion cycle. In comparison, all of the parallel algorithms used in prior art do not provide these values immediately at the end of the conversion cycle, and also require more complex and expensive hardware.

It should be noted that the described serial conversion algorithm used by the improved analog-to-digital pseudo-logarithmic converter of the present invention is not limited to the conversion from an 11-bit linear to a 7-bit pseudo-logarithmic code. The same algorithm can be used for the conversion of any linear to non-linear code, such as a 12-bit linear to an 8-bit pseudo-logarithmic code. The only required circuit change is the increase of length of shift register 30 so that it is capable of storing the increased number of bits in the mantissa of the pseudo-logarithmic code being used.

A first embodiment of the improved pseudo-rms to dc converter for providing the average value analog voltage $X_j$, as shown in FIG. 2, replaces the pseudo-rms to dc converter stage 60 of my prior digital echo canceller, as shown in FIG. 1.

Sample $|x_i|$ at the second output of absolute value stage 112 is provided to an input of a low pass filter, designated generally by the reference numeral 130. Low pass filter 130 is of conventional design and it is an R-C network of the type well known in the art. Specifically, the input of the low pass filter 130 is the input of an operational amplifier 132. Operational amplifier 132 is of conventional design. The output of operational amplifier 132 is applied to one lead of a resistor 134. The other lead of resistor 134 is connected to one lead of a capacitor 136. The other lead of capacitor 136 is connected to ground. Resistor 134 and capacitor 136 together form the R-C circuit that defines the frequency response of low pass filter 130.

The limiting frequency $\omega_o$ of low pass filter 130 is set to:

$$0.6\,\omega_m < \omega_o < 0.2\,\omega m \quad (1)$$

where, $\omega_m = 2\pi f_m$;

$f_m$ = minimum frequency of analog X(t), which typically for telephone transmission is approximately 300 Hz.

As is well known, the integration time constant of low pass filter 130 is equal to $1/\omega_o$.

The output of low pass filter 130 is applied to the input of a peak detector, designated generally by the reference number 138. Peak detector 138 detects all input signals having an amplitude above a set cut-in level, and has a release time constant $t_r$ substantially longer than the integration time constant $1/\omega_o$ of low pass filter 130, e.g., $t_r \geq 4/\omega_o$.

The input of peak detector 138 is the anode of a diode 140. The cathode of diode 140 is connected to a biasing voltage source $V_+$ via a bias resistor 142. Thus, bias voltage source $V_+$ together with bias resistor 142 set the cut-in level of diode 140.

The cathode of diode 140 is also connected to the first leads of a capacitor 144 and a resistor 146. The second leads of capacitor 144 and resistor 146 are connected to ground. The component values of the capacitor 144 and the resistor 146 set the release time constant $t_r$ of the peak detector 138.

The output of the peak detector 138, at the first lead of resistor 146, is applied to the input of an operational amplifier 148. Operational amplifier 148 is of conventional design. The output of operational amplifier 148 is the average value analog voltage $X_j$. The average value analog voltage $X_j$ is applied to a line 150.

The relationship of the integration time constant $1/\omega_o$ of the low pass filter 130 and the release time constant of the peak detector 138 can be chosen so that a sinewave signal and a white noise signal with equal rms amplitudes applied to the input of operational amplifier 132 will produce the same value for the average value analog voltage $X_j$ on line 150. Thus, the average value analog voltage $X_j$ can be considered as being proportional to the rms value of the analog signal X(t).

The theory behind this proportional relationship between the rms value of the analog signal X(t) and the average value analog voltage $X_j$ begins with the following inequality which applies during a period of a periodic waveform signal:

$$v_{ave} \leq v_{rms} \leq v_{peak} \quad (2)$$

The sample $|x_i|$ at the second output of the absolute value stage 112 is proportional to the average value of the analog signal X(t). Because of the short integration time constant $1/\omega_o$, the output signal of the low pass filter 130 can respond to the fast peaks in analog signal X(t). Further, these fast peaks, because of the long release time constant $t_r$, can be held over for a longer period of time by peak detector 138. Thus the average value analog voltage $X_j$ on line 150 averages a greater value than the output of the low pass filter 130, and thus equation (2) holds true. It follows that if the statistical properties of band limited signal X(t) are known, the time constants $1/\omega_o$ and $t_r$ can be adjusted so that the average value analog voltage $X_j$ is equal to that of a sinewave having the same rms value.

Figure 3:
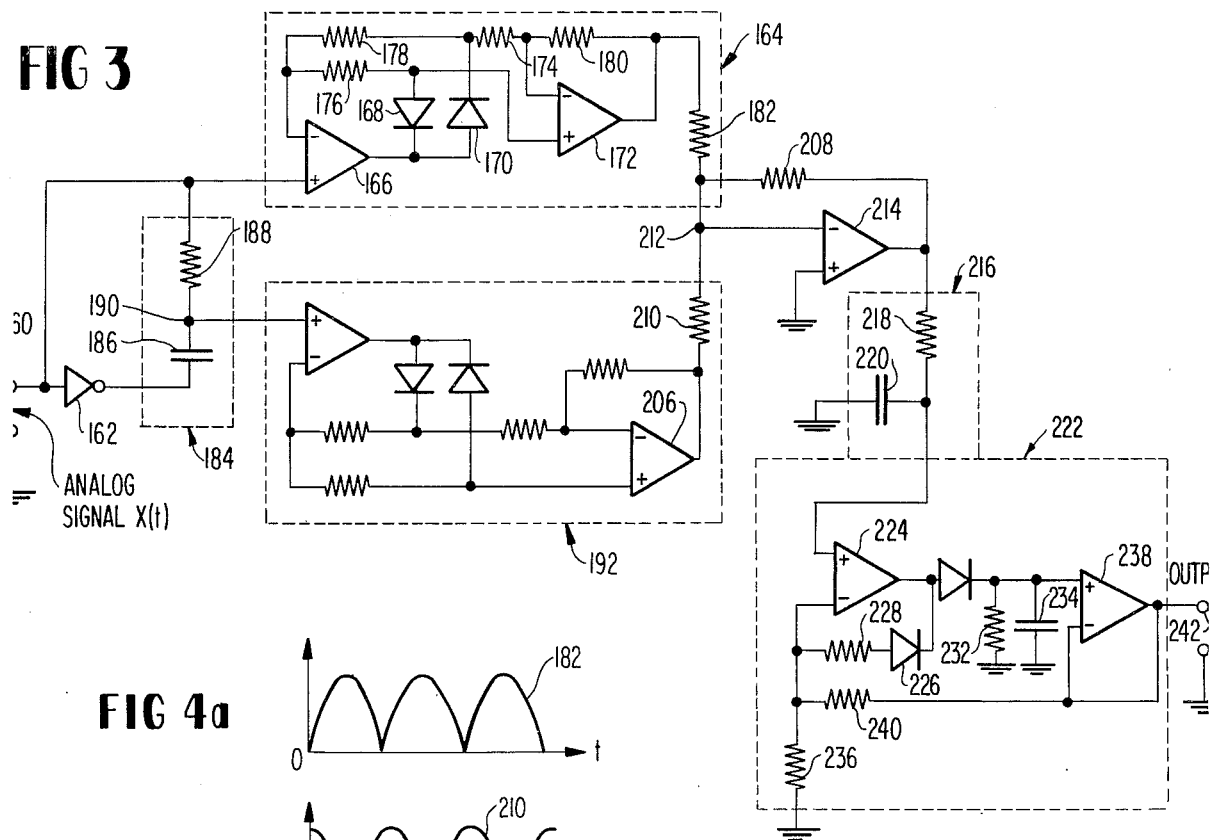
FIG. 3 is a block diagram of the second embodiment of the improved pseudo-rms to dc converter of the present invention.

An alternative embodiment of the improved pseudo-rms to dc converter for providing the average value analog voltage $X_j$, as shown in FIG. 3, replaces the pseudo-rms to dc converter stage 60 of my prior digital echo canceller, as shown in FIG. 1.

The analog signal X(t) is applied to an input line 160. Input line 160 provides the analog signal X(t) to a first full-wave rectifier stage, designated generally by the reference numeral 164. The circuit design of full-wave rectifier stage 164 is disclosed at pp. 23–24 of the prior cited *Analog-Digital Conversion Handbook*, 2d ed., 1976. Full-wave rectifier stage 164 provides as an output the full-wave rectified version of the analog signal X(t).

Specifically, analog signal X(t) is provided via input line 160 to the non-inverting input of an operational amplifier 166. Operational amplifier 166 is of conventional design. The output of operational amplifier 166 is applied to the cathode of a diode 168 and to the anode of a diode 170. The anode of diode 168 is connected to the non-inverting input of an operational amplifier 172. Operational amplifier 172 is of conventional design. The cathode of diode 170 is connected via a resistor 174 to the inverting input of operational amplifier 172. A resistor 176 is connected between the inverting input of the operational amplifier 166 and the anode of diode 168 so as to provide a feedback path. Similarly, a resistor 178 is connected between the inverting input of the operational amplifier 166 and the cathode of diode 170 so as to provide a feedback path. Moreover, a resistor 180 is connected between the output and the inverting input of the operational amplifier 172 so as to provide a feedback path.

Figure 4A:
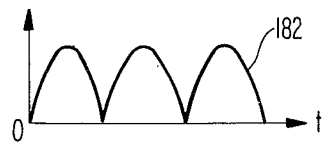
FIGS. 4a, 4b and 4c show the voltage waveforms at specific points of the circuit shown in FIG. 3.

One lead of a resistor 182 is connected to the output of the operational amplifier 172. The signal at the other lead of resistor 182 is the full-wave rectified version of the analog signal X(t). The full-wave rectified signal at the second lead of resistor 182, which contains the second harmonic of the analog signal X(t), is illustrated by waveform 182 of FIG. 4(a).

The analog signal X(t) is also applied by input line 160 to the input of an inverter 162. Inverter 162 is of conventional design. The output of inverter 162 is applied to a phase shift network, designated generally by the reference numeral 184. Phase shift network 184 is of conventional design. Specifically, the output of inverter 162 is applied to the first lead of a capacitor 186. The other lead of capacitor 186 is connected to a node 190. A resistor 188 is connected between the node 190 and the input line 160. A component values of the capacitor 186 and the resistor 188 are selected so that the lowest frequency $f_m$ of analog signal X(t) is shifted by 90° at node 190.

The phase-shifted signal at node 190 is applied to a second full-wave rectifier, designated generally by the reference numeral 192. The circuit design of full-wave rectifier stage 192 is identical to that of full-wave rectifier stage 164 and, therefore, need not be described further.

Figure 4B:
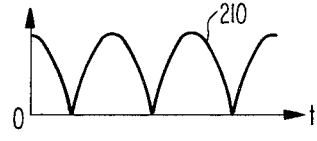

One lead of a resistor 210 is connected to the output of the operational amplifier 206. The signal at the other lead of resistor 210 is the full-wave rectified version of the phase-shifted analog signal X(t) present at node 190. This full-wave rectified signal at the second lead of resistor 210, which is the second harmonic of the phase-shifted version of analog signal X(t) present at node 190, is illustrated by waveform 210 of FIG. 4(b).

The full-wave rectified signal at the second lead of resistor 182 is applied to a node 212. Similarly, the full-wave rectified signal at the second lead of resistor 210 is applied to the node 212. Node 212, in turn, is connected to the inverting input of an operational amplifier 214.

Operational amplifier 214 is connected to act as a summer of the two full-wave rectified signals present at node 212. A resistor 208 is connected between the output and the inverting input of the operational amplifier 214 so as to provide a feedback path. The non-inverting input of the operational amplifier 214 is connected to ground.

Figure 4C:
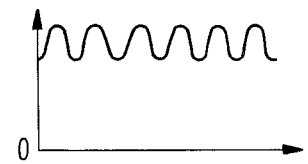

The signal present at the output of the operational amplifier 214 is the sum of the two full-wave rectified signals present at node 212. This summed signal at the output of the operational amplifier 214 contains the fourth harmonic of the analog signal X(t), as shown by the waveform of FIG. 4(c).

The summed signal at the output of the operational amplifier 214 is provided to the input of a low pass filter, designated generally by the reference numeral 216. Low pass filter 216 is of conventional design and it is a R-C network of the type well known in the art. Specifically, the input of the low pass filter 216 is the first lead of a resistor 218. The second lead of a resistor 218 is connected to the first lead of a capacitor 220. The second lead of capacitor 220 is connected to ground. Resistor 218 and capacitor 220 together form the R-C circuit that defines the frequency response of low pass filter 216.

The limiting frequency $\omega_o$ of the low pass filter 216 is set to:

$$1.2\ \omega_m < \omega_o < 0.4\ \omega_o$$

where, $\omega_m = 2\ \pi f_m$;

$f_m$ = minimum frequency of analog X(t), which typically for telephone transmission is approximately 300 Hz.

As is well known, the integration time constant of the low pass filter 216 is equal to $1/\omega_o$.

The output of the low pass filter 216, present at the second lead of resistor 218 is applied to the input of a peak detector, designated generally by the reference numeral 222. Peak detector 222 detects all of the peaks of the input four-harmonic signal which exceed a set cut-in level, and has a release time constant $t_r$ substantially larger than the integration time constant $1/\omega_o$ of the low pass filter 216, e.g., $t_r \geq 4/\omega_o$.

The input of the peak detector 222 is the non-inverting input of an operational amplifier 224. Operational amplifier 224 is of conventional design. The cathode of a diode 226 is connected to the output of the operational amplifier 224. The anode of diode 206 is connected via a resistor 228 to the inverting input of the operational amplifier 224. Thus, the diode 226 and the resistor 228 form a feedback path. The inverting input of the operational amplifier 224 is connected to ground via a resistor 236.

The output of the operational amplifier 224 is connected to the anode of a diode 230. The cathode of diode 230 is connected to the first lead of a resistor 232 and to the first lead of a capacitor 234. The second lead of resistor 232 and the second lead of capacitor 234 are each connected to ground. The component values of the resistor 232 and the capacitor 234 set the release time constant $t_r$ of the peak detector 222.

The output at the first lead of capacitor 234 is applied to the non-inverting input of an operational amplifier 238. The output and the inverting input of the operational amplifier 238 are connected together. The inverting input of the operational amplifier 238 is connected via a resistor 240 to the inverting input of the operational amplifier 224.

The output of the operational amplifier 238 is provided to the output 242 of the peak detector 222. The signal at the output 242 is the average value analog voltage $X_j$.

The main limitation of the first embodiment of the pseudo-rms to dc converter is that the low pass filter 130 must effectively filter out the lowest frequency $f_m$ of the analog signal $X(t)$. This filtration requirement limits the rise time of the average value analog voltage $X_j$. This limitation in the rise time becomes critical when the level of the analog signal $X(t)$ suddenly increases.

This rise time limitation has been overcome by the pseudo-rms to dc converter shown in FIG. 3. The rise time of the peak detector 222 is very short for two reasons. First, the output impedance of the operational amplifier 224 is very low. Second, the capacitor 234 is inside the negative feedback loop from the output of the operational amplifier 238 to the inverting input of the operational amplifier 224. Thus, the rise time of the peak detector 222 is effectively limited only by the slew rate of the operational amplifier 224.

The second embodiment of the pseudo-rms to dc converter of the present invention can be further improved by using a more sophisticated 90° phase shift network 184 instead of the simple capacitor 186 and resistor 188 combination shown in FIG. 3. Instead, a more sophisticated R-L-C network could be used for improved performance. Further improvement also can be had by changing the R-C low pass filter 216 to one having a resistor, capacitor and inductor. Such as R-L-C low pass filter allows a better filter to response time relationship than that possible with the simpler resistor 218 and capacitor 220 combination shown.

Although the second embodiment of the pseudo-rms to dc converter appears to be complex, it should be noted that it is very economical to implement because of recent developments in integrated electronics. Specifically, the very inexpensive MSI device MC 3503 that is commercially available from *Motorola Semiconductor Products, Inc.*, Phoenix, Ariz., contains four op-amps in a single package and is suitable for the present invention.

The improved generator of the $\phi(x)$ function of the present invention, as shown in FIG. 2, replaces stage 20 of my prior digital echo canceller.

As shown in FIG. 2, the second output of the absolute value stage 112 is applied to the plus input of a comparator 250. Comparator 250 is of conventional design. The average value analog signal $X_j$, present at line 150, is applied to the negative input of the comparator 250. The output of the comparator 250 is applied to the first input of an AND gate 256.

The plus input of the comparator 250 is also connected to the plus input of a comparator 252. Comparator 252 is of conventional design. The minus input of comparator 252 is connected to $V_{REF1}$ set to the amplitude of the background noise in the receive-in channel. The output of comparator 252 is applied to the second input of the AND gate 256.

The plus input of comparator 250 is also connected to the minus input of a comparator 254. Comparator 254 is of conventional design. The plus input of the comparator 254 is connected to $V_{REF2}$ set to the maximum amplitude before overload for the receive-in channel. The output of comparator 254 is applied to the third input of the AND gate 256. The output of the AND gate 256, which is the logical signal $\phi(x)$, is applied to the X-register 16.

The operation of the improved $\phi(x)$ generator of the present invention is now described. Everytime a new sample $|x_i|$ appears at the second output of the absolute value stage 112, it is compared during the analog-to-digital conversion of the analog-to-digital converter 116 with the average value analog voltage $X_j$ in comparator 250. Sample $|x_i|$ is simultaneously compared with reference voltage $V_{REF1}$ in comparator 252 and is also simultaneously compared with reference voltage $V_{REF2}$ in comparator 254. The output of each of the comparators is combined in the AND gate 256. The output $\phi(x)$ of the AND gate 256 is a logical 1 if and only if sample $|x_i|$ fulfills the following three conditions:

(a) the amplitude of sample $|x_i|$ is greater than the average value analog voltage $X_j$;

(b) the amplitude of sample $|x_i|$ is less than the amplitude of $V_{REF2}$ (this protects the impulse response stored in the H-register from distortion caused by an overload signal in the receivein side of the channel);

(c) the amplitude of sample $|x_i|$ is greater than the amplitude of $V_{REF1}$ (this protects the impulse response stored in the H-register from distortion caused when no voice signal is present in the voice-in channel).

In the $\phi(x)$ generator 20 of my prior digital echo canceller, the variable $\phi(x)$ was computed for every sample $|x_i|$ every time the sample $|x_i|$ entered the cross-correlation processor. Experiments using my prior echo canceller have shown, however, that during the period of 32 to 64 m.sec., which corresponds to 256 to 512 $|x_i|$ samples stored in X-register 16, the change of the average value analog voltage $X_j$ is so slow that the $\phi(x)$ value can be determined at the moment of the sample and stored in X-register 16 along with the other values associated with the sample. As explained above, this single computation of variable $\phi(x)$ for each sample $|x_i|$ is done in the improved $\phi(x)$ generator of the present invention. An additional development of the improved $\phi(x)$ generator is that the variable $\phi(x)$ is available from X-register 16 at the same time the corresponding pseudo-logarithmic encoded sample $|x_i|$ is also available.

The improved $\phi(x)$ generator of the present invention is very inexpensive to implement. Comparators 250, 252 and 254 are inexpensive, standard commercially available units. AND gate 256 is also an inexpensive, standard commercially available unit. The additional bit required in X-register 16 for storage of the $\phi(x)$ logical value is also inexpensive to implement.

Figure 5:
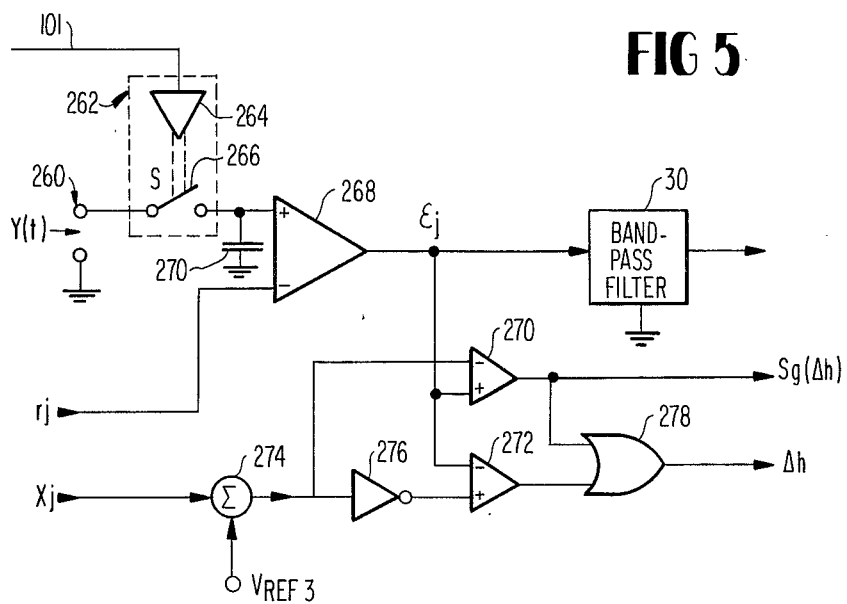
FIG. 5 is a block diagram of the improved error detector of the present invention.

The improved error detector of the present invention, as shown in FIG. 5, replaces stage 70 of my prior digital echo canceller, as shown in FIG. 1.

The true echo signal $y(t)$ is applied to an input 260 connected to a sample and hold stage, designated generally by reference numeral 262. Sample and hold stage 262 has a driver 264 connected to a line 101 to receive a sample command from my prior digital echo canceller, and also has an electronic switch 266 which is controlled by driver 264. The output of sample and hold stage 262 is connected to the non-inverting input of an operational amplifier 268. A capacitor 270 is connected between the non-inverting input of the operational amplifier 268 and ground. The computed echo signal estimate $r_j$ from my prior digital echo canceller is fed to the inverting input of the operational amplifier 268.

The output of the operational amplifier 268 is the difference signal $\epsilon_j$. The difference signal $\epsilon_j$ is applied to the band-pass filter 30 of my prior digital echo canceller. The difference signal $\epsilon_j$ is also applied to the plus input of a comparator 270 and is also applied to the minus input of a comparator 272. Comparators 270 and 272 are of conventional design.

The average value analog voltage $X_j$ is applied to the first input of an adder circuit 274. A voltage reference $V_{REF3}$ is applied to the second input of the adder circuit 274. The output of the adder circuit 274 is applied to the minus input of the comparator 270. The output of the adder circuit 274 is also applied to the input of an inverter 276. Inverter 276 is of conventional design. The output of the inverter 276 is applied to the plus input of the comparator 272. The output of the comparator 270 is connected to the first input of an OR gate 278. OR gate 278 is of conventional design. The output of the comparator 272 is connected to the second input of the OR gate 278.

Each time the difference signal $\epsilon_j$ exceeds the output of the adder circuit 274, the quantized signal $\Delta h$ is produced at the output of the OR gate 278 and the logical sign signal $Sg(\Delta h)$ of the quantized signal $\Delta h$ is produced at the output of the comparator 270. The value of the voltage reference $V_{REF3}$ is set to limit the sensitivity of the comparators 270, 272. Thus, when the difference signal $\epsilon_j$ is less than the signal at the output of the adder circuit 274, there is no quantized signal $\Delta h$ produced at the output of OR gate 278 and there is no logical sign signal $Sg(\Delta h)$ produced at the output of the comparator 270.

While the invention has been disclosed with respect to the preferred embodiments thereof, it will be understood by those skilled in the art that various changes in form and detail may be made therein without departing from the spirit and scope of the invention as set forth in the appended claims.

What is claimed is:

1. A digital echo canceller of the type having converting means for converting a fixed number of most recent samples $x_1, \ldots, x_i, \ldots, x_n$ of a received signal into a logarithmic format having sign, exponent and mantissa, X-register means for storing said most recent samples $x_1, \ldots, x_i, \ldots, x_n$ in said logarithmic format, H-register means for storing a corresponding fixed number of estimated impulse response coefficients $h_1, \ldots, h_i, \ldots, h_n$ in a logarithmic format having sign, exponent and mantissa, means responsive to said stored samples and said stored coefficients for multiplying by the addition of the logarithms of said stored samples and said stored coefficients, means for accumulating the products generated by said multiplying means to produce an approximate echo signal, subtracting means for subtracting said approximate echo signal from a real echo signal thereby producing a difference signal corresponding to a residual echo, and cross-correlation means responsive to said residual echo and said stored samples for updating said stored coefficients respectively, the improvement wherein said converting means comprises:

a. analog-to-digital converter means responsive to said most recent samples $x_1, \ldots, x_i, \ldots, x_n$ of said received signal for digitally encoding each of said samples to a serial code arranged in order from most significant bit to least significant bit, for outputing at a first output each of said bits of each said serial code individually while also providing a control signal at a clock output corresponding to the outputing of each of said bits of each said serial code, and for providing at a second output a logical signal indicating the sign of each of said digitally encoded most recent samples;

b. shift register means connected at a first input to said first output of said analog-to-digital converter means for receiving each of said bits of each of said serial code outputed by said analog-to-digital converter means, for storing each of said received bits when a corresponding store signal is received at a clock input, for providing a plurality of non-inverting outputs, each of said non-inverting outputs being connected to one of the corresponding plurality of stages of said shift register means immediately adjacent said first input, for providing first and second inverting outputs, said first and second inverting outputs being connected to the two stages of said shift register means most remote from said first input;

c. a first logic control means responsive to said control signal at said clock output of said analog-to-digital converter means and responsive to a logical one bit at said first inverting output of said shift register means for providing said store signal to said clock input of said shift register means when said control signal and a logical one bit at said first inverting output are simultaneously present;

d. a second logic control means responsive to a logical one bit at both said first and said second inverting outputs of said shift register means and responsive to said control signal at said clock output of said analog-to-digital converter means for providing a countdown signal each time a logical one bit at said first inverting output and a logical one bit at said second inverting output and said control signal are simultaneously present;

e. counter means responsive to said countdown signal of said second logic control means for counting down one bit from a preset binary value each time said countdown signal is received, said counter means being preset at the beginning of the digital encoding of each of said samples, whereby said non-inverting outputs of said shift register means provide the mantissa, said outputs of said counter means provide the exponent, and said second output of said analog-to-digital converter means provides the sign of said logarithmic format of each said digitally encoded most recent sample, each said logarithmic format is sent to said X-register.

2. The digital echo canceller of claim 1, wherein said analog-to-digital converter means comprises:

a. an absolute value stage responsive to said most recent samples $x_1, \ldots, x_i, \ldots, x_n$ of said received signal for providing at a first output each of said most recent samples and at a second output a corresponding absolute value signal of each of said most recent samples;

b. a comparator connected to said first output of said absolute value stage for providing at said second output of said analog-to-digital converter means said logical signal indicating the sign of each of said digitally encoded most recent samples; and c. a linear analog-to-digital converter being connected at an input to said second output of said absolute value stage for digitally encoding each said absolute value signal of each said most recent sample to a linear serial code arranged in order from most significant bit to least significant bit, and for outputting at said first output of said analog-to-digital converter means each of said bits of each said linear serial code individually while also providing a control signal at said clock output corresponding to the outputting of each of said bits of each said linear serial code.

3. The digital echo canceller of claim 2, wherein said cross-correlation means includes average value generating means for generating an average value analog voltage $X_j$ of said samples, comparing means for comparing said difference signal from said means for subtracting with said average value analog voltage $X_j$ and producing a quantized signal $\Delta h$ corresponding to the mantissa of a correction to that stored coefficient, means controlled by said average value generating means for multiplying said stored coefficient by a multiplier by the addition of the logarithm of said stored coefficient and the logarithm of one plus or minus the quantized signal from said comparing means, the improvement wherein the average value generating means comprises:
  a. low pass filter means having an input connected to said first output of said absolute value stage and having a limiting frequency less than the minimum frequency of said received signal and having an integration time constant equal to the inverse of said limiting frequency for providing at an output a signal in which all frequencies greater than said minimum frequency of said received signal are substantially attenuated; and
  b. peak detector means having an input connected to said output of said low pass filter means and having a release time constant substantially longer than said integration time constant of said low pass filter means for providing at an output a signal averaging a greater value than said signal at said output of said low pass filter means, whereby the signal at said output of said peak detector means is said average value analog voltage $X_j$.

4. The digital echo canceller of claim 1, wherein said cross-correlation means includes average value generating means for generating an average value analog voltage $X_j$ of said samples, comparing means for comparing said difference signal from said means for subtracting with said average value analog voltage $X_j$ and producing a quantized signal $\Delta h$ corresponding to the mantissa of a correction to that stored coefficient, means controlled by said average value generating means for multiplying said stored coefficient by a multiplier by the addition of the logarithm of said stored coefficient and the logarithm of one plus or minus the quantized signal from said comparing means, the improvement wherein the average value generating means comprises:
  a. first full-wave rectifier having an input responsive to said received signal for providing at an output a full-wave rectified signal;
  b. an inverter having an input and an output, said input responsive to said received signal;
  c. phase shift means having an input connected to the output of said inverter for providing at an output a signal having a phase shift of approximately 90° to the lowest frequency component of said inverted received signal at the output of said inverter;
  d. second full-wave rectifier having an input connected to said output of said phase shift means for providing at an output a full-wave rectified signal;
  e. summer means having a first input connected to said output of said first full-wave rectifier and having a second input connected to said output of said second full-wave rectifier for providing at an output a composite signal being the fourth harmonic of said received signal;
  f. low pass filter means having an input connected to the output of said summer means and having a limiting frequency less than the minimum frequency of said received signal and having an integration time constant equal to the inverse of said limiting frequency for providing at an output a signal in which all frequencies greater than the minimum frequency of said received signal are substantially attenuated; and
  g. peak detector means having an input connected to said output of said low pass filter means and having a release time constant substantially longer than said integration time constant of said low pass filter for providing at an output a signal averaging a greater value than said signal at said output of said low pass filter means, whereby the signal at said output of said peak detector means is said average value analog voltage $X_j$.

5. The digital echo canceller of claim 4, wherein the peak detector means comprises:
  a. a peak detector having an input and an output, said input being connected to said output of said low pass filter means;
  b. time constant means having an input connected to said output of said peak detector and having a time constant for providing a signal averaging a greater value than said signal at said output of said low pass filter means; and
  c. an output amplifier having an input and an output, said input connected to said output of said time constant means, whereby the signal at said output of said output amplifier is said average value analog voltage $X_j$.

6. The echo canceller of claim 1, wherein said cross-correlation means includes average value generating means for generating an average value analog voltage $X_j$ of said samples, comparing means for comparing said difference signal from said means for subtracting with said average value analog voltage $X_j$ and producing a quantized signal $\Delta h$ corresponding to the mantissa of a correction to that stored coefficient, means controlled by said average value generating means for multiplying said stored coefficient by a multiplier by the addition of the logarithm of said stored coefficient and the logarithm of one plus or minus the quantized signal from said comparing means, the improvement wherein the comparing means comprises:
  a. a first comparator having a plus input and a minus input and an output, said minus input being connected to said average value analog voltage $X_j$ of said average value generating means and said plus input being responsive to said difference signal;
  b. an inverter having an input and an output, said input being connected to said average value analog voltage $X_j$ of said average value generating means;
  c. a second comparator having a plus input and a minus input and an output, said minus input being responsive to said difference signal and said plus input being connected to said output of said inverter; and
  d. an OR gate having a first input and a second input and an output, said first input being connected to said output of said first comparator and said second input being connected to the output of said second comparator, whereby the quantized signal $\Delta h$ is produced at said output of said OR gate and the logical sign signal of said quantized signal $\Delta h$ is produced at said output of said first comparator.

7. The digital echo canceller of claim 6, further comprising:
   a. an adder circuit having a first input and a second input and an output, said first input being responsive to said average value analog voltage $X_j$ of said average value generating means and said output being connected to said input of said inverter and to said minus input of said first comparator; and
   b. bias voltage means connected to said second input of said adder circuit for providing a bias voltage, whereby said quantized signal $\Delta h$ is not produced at said output of said OR gate and said logical sign signal of said quantized signal $\Delta h$ is not produced at said output of said first comparator when said difference signal is less than the signal at said output of said adder circuit.

8. The digital echo canceller of claim 2, wherein said cross-correlation means includes average value generating means for generating an average value analog voltage $X_j$ of said samples, comparing means for comparing said difference signal from said means for subtracting with said average value analog voltage $X_j$ and producing a quantized signal $\Delta h$ corresponding to the mantissa of a correction to that stored coefficient, means controlled by said average value generating means for multiplying said stored coefficient by a multiplier by the addition of the logarithm of said stored coefficient and the logarithm of one plus or minus the quantized signal from said comparing means, the improvement further comprising:
   a. a first comparator having a plus input and a minus input and an output, said minus input responsive to said average value analog voltage $X_j$ of said average value generating means and said plus input responsive to said absolute value signal of said most recent samples at said second output of said absolute value stage;
   b. minimum voltage reference means for providing at an output a minimum voltage reference signal;
   c. maximum voltage reference means for providing at an output a maximum voltage reference signal;
   d. a second comparator having a plus input and a minus input and an output, said plus input responsive to said absolute value signal of said most recent samples at said second output of said absolute value stage and said minus input connected to said output of said minimum reference voltage;
   e. a third comparator having a plus input and a minus input and an output, said plus input connected to said minus input responsive to said absolute value signal of said most recent samples at said second output of said absolute value stage; and
   f. an AND gate having a first input and a second input and a third input and an output, said first input being connected to said output of said first comparator, said second input being connected to said output of said second comparator, said third input being connected to said output of said third comparator, whereby the logical signal $\phi(x)$ at said output of said AND gate is produced only when said absolute value signal of said most recent sample is greater than said average value analog voltage $X_j$, is greater than said minimum voltage reference signal, and is less than said maximum voltage reference signal.

9. A circuit for converting a fixed number of samples $x_1, \ldots, x_j, \ldots, x_n$ of a signal into a logarithmic format having sign, exponent and mantissa, said circuit comprising:
   a. analog-to-digital converter means responsive to said samples $x_1, \ldots, x_j, \ldots, x_n$ of said signal for digitally encoding each of said samples to a serial code arranged in order from most significant bit to least significant bit, for outputing at a first output each of said bits of each said serial code individually while also providing a control signal at a clock output corresponding to the outputing of each of said bits of each said serial code, and for providing at a second output a logical signal indicating the sign of each of said digitally encoded most recent samples;
   b. shift register means connected at a first input to said first output of said analog-to-digital converter means for receiving each of said bits of each of said serial code outputed by said analog-to-digital converter means, for storing each of said received bits when a corresponding store signal is received at a clock input, for providing a plurality of non-inverting outputs, each of said non-inverting outputs being connected to one of the corresponding plurality of stages of said shift register means immediately adjacent said first input, for providing first and second inverting outputs, said first and second inverting outputs being connected to the two stages of said shift register means most remote from said first input;
   c. a first logic control means responsive to said control signal at said clock output of said analog-to-digital converter means and responsive to a logical one bit at said first inverting output of said shift register means for providing said store signal to said clock input of said shift register means when said control signal and a logical one bit at said first inverting output are simultaneously present;
   d. a second logic control means responsive to a logical one bit at both said first and said second inverting outputs of said shift register means and responsive to said control signal at said clock output of said analog-to-digital converter means for providing a countdown signal each time a logical one bit at said first inverting output and a logical one bit at said second inverting output and said control signal are simultaneously present;
   e. counter means reponsive to said countdown signal of said second logic control means for counting down one bit from present binary value each time said countdown signal is received, said counter means being preset at the beginning of the digital encoding of each of said samples, whereby said non-inverting outputs of said shift register means provide the mantissa, said outputs of said counter means provide the exponent, and said second output of said analog-to-digital converter means provides the sign of said logarithmic format of each said digitally encoded most recent sample.

10. The circuit of claim 9, wherein said analog-to-digital converter means comprises:
   a. an absolute value stage responsive to said most recent samples $x_1, \ldots, x_j, \ldots, x_n$ of said received signal for providing at a first output each of said most recent samples and at a second output a corresponding absolute value signal of each of said most recent samples;

b. a comparator connected to said first output of said absolute value stage for providing at said second output of said analog-to-digital converter means said logical signal indicating the sign of each of said digitally encoded most recent samples; and c. a linear analog-to-digital converter being connected at an input to said second output of said absolute value stage for digitally encoding each said absolute value signal of each said most recent sample to a linear serial code arranged in order from most significant bit to least significant bit, and for outputing at said first output of said analog-to-digital converter means each of said bits of each said linear serial code individually while also providing a control signal at said clock output corresponding to the outputing of each of said bits of each said linear serial code.

11. A circuit for converting an analog signal into a digital signal of logarithmic format having sign, exponent and mantissa, said circuit comprising:

a. sample-and-hold means responsive to said analog signal for providing samples $x_1, \ldots, x_i, \ldots, x_n$ of said analog signal;

b. analog-to-digital converter means responsive to said samples $x_1, \ldots, x_i, \ldots, x_n$ of said analog signal for digitally encoding each of said samples to a serial code arranged in order from most significant bit to least significant bit, for outputting at a first output each of said bits of each said serial code individually while also providing a control signal at a clock output corresponding to the outputing of each of said bits of each said serial code, and for providing at a second output a logical signal indicating the sign of each of said digitally encoded most recent samples;

c. shift register means connected at a first input to said first output of said analog-to-digital converter means for receiving each of said bits of each of said serial code outputed by said analog-to-digital converter means, for storing each of said received bits when a corresponding store signal is received at a clock input, for providing a plurality of non-inverting outputs, each of said non-inverting outputs being connected to one of the corresponding plurality of stages of said shift register means immediately adjacent said first input, for providing first and second inverting outputs, said first and second inverting outputs being connected to the two stages of said shift register means most remote from said first input;

d. a first logic control means responsive to said control signal at said clock output of said analog-to-digital converter means and responsive to a logical one bit at said first inverting output of said shift register means for providing said store signal to said clock input of said shift register means when said control signal and a logical one bit at said first inverting output are simultaneously present;

e. a second logic control means responsive to a logical one bit at both said first and said second inverting outputs of said shift register means and responsive to said control signal at said clock output of said analog-to-digital converter means for providing a countdown signal each time a logical one bit at said first inverting output and a logical one bit at said second inverting output and said control signal are simultaneously present;

f. counter means responsive to said countdown signal of said second logic control means for counting down one bit from a present binary value each time said countdown signal is received, said counter means being preset at the beginning of the digital encoding of each of said samples, whereby said non-inverting outputs of said shift register means provide the mantissa, said outputs of said counter means provide the exponent, and said second output of said analog-to-digital converter means provides the sign of said logarithmic format of each said digitally encoded most recent sample.

12. A pseudo-rms value circuit comprising:

a. first full-wave rectifier having an input responsive to an input signal for providing at an output a full-wave rectified signal;

b. an inverter having an input and an output, said input responsive to said input signal;

c. phase shift means having an input connected to the output of said inverter for providing at an output a signal having a phase shift of approximately ninety degrees to the lowest frequency component of said inverter;

d. second full-wave rectifier having an input connected to said output of said phase shift means for providing at an output a full-wave rectified signal;

e. summer means having a first input connected to said output of said first full-wave rectifier and having a second input connected to said output of said second full-wave rectifier for providing at an output a composite signal being the fourth harmonic of said input signal;

f. low pass filter means having an input connected to the output of said summer means and having a limiting frequency less than the minimum frequency of said input signal and having an integration time constant equal to the inverse of said limiting frequency for providing at an output a signal in which all frequencies greater than the minimum frequency of said input signal are substantially attenuated; and g. peak detector means having an input connected to said output of said low pass filter means and having a release time constant substantially longer than said integration time constant of said low pass filter for providing at an output a signal averaging a greater value than said signal at said output of said low pass filter means, whereby the signal at said output of said peak detector means is the pseudo-rms value of the analog voltage.

13. The pseudo-rms value circuit of claim 12, wherein the peak detector means comprises:

a. a peak detector having an input and an output, said input being connected to said output of said low pass filter means;

b. time constant means having an input connected to said output of said peak detector and having a time constant substantially longer than said integration time constant for providing a signal averaging a greater value than said signal at said output of said low pass filter means; and c. an output amplifier having an input and an output, said input connected to said output of said time constant means, whereby the signal at said output of said output amplifier is the pseudo-rms value of the analog voltage.

* * * * *

UNITED STATES PATENT AND TRADEMARK OFFICE
CERTIFICATE OF CORRECTION

PATENT NO. : 4,113,997
DATED : September 12, 1978
INVENTOR(S) : Otakar Anthony HORNA It is certified that error appears in the above-identified patent and that said Letters Patent are hereby corrected as shown below:

Column 1, line 11 - delete "1967" insert -- 1976 --

Column 4, line 29 - after "signal" delete "to" insert -- of --

Column 7, line 33 - delete "The" insert -- This --

Column 7, line 46 - delete "A" insert -- The --

Column 8, line 50 - delete "diode 206" insert -- diode 226 --

Column 9, line 32 - after "Such" delete "as" insert -- an --

Column 10, line 21 - delete "receivein" insert -- receive-in --

Column 16, line 51 - delete "present" insert -- a preset --

Column 18, line 3 - delete "present" insert -- preset --

Signed and Sealed this

Sixteenth Day of January 1979

[SEAL]

Attest:

RUTH C. MASON
Attesting Officer

DONALD W. BANNER
Commissioner of Patents and Trademarks